United States Patent
Garcia

(10) Patent No.: US 11,438,330 B2
(45) Date of Patent: Sep. 6, 2022

(54) BIOMETRIC CLOUD AUTHENTICATION GATEWAY DATABASE SYSTEM AND METHOD OF USE

(71) Applicant: Bernard Garcia, Newark, NJ (US)

(72) Inventor: Bernard Garcia, Newark, NJ (US)

(*) Notice: Subject to any disclaimer, the term of this patent is extended or adjusted under 35 U.S.C. 154(b) by 0 days.

(21) Appl. No.: 16/725,401

(22) Filed: Dec. 23, 2019

(65) Prior Publication Data

US 2020/0145411 A1    May 7, 2020

Related U.S. Application Data

(63) Continuation of application No. 15/657,960, filed on Jul. 24, 2017, now abandoned.

(51) Int. Cl.
| | |
|---|---|
| *H04L 9/40* | (2022.01) |
| *G06V 10/94* | (2022.01) |
| *G06V 40/50* | (2022.01) |
| *G06V 40/70* | (2022.01) |
| *G06V 40/14* | (2022.01) |

(52) U.S. Cl.
CPC .......... *H04L 63/0861* (2013.01); *G06V 10/95* (2022.01); *G06V 40/50* (2022.01); *G06V 40/70* (2022.01); *G06V 40/14* (2022.01)

(58) Field of Classification Search
CPC combination set(s) only.
See application file for complete search history.

(56) References Cited

U.S. PATENT DOCUMENTS

| | | |
|---|---|---|
| 7,249,177 B1 | 7/2007 | Miller |
| 8,046,588 B2 | 10/2011 | Gibart et al. |
| 9,152,770 B2 | 10/2015 | Matsushima et al. |
| 9,165,130 B2 | 10/2015 | Malpani et al. |

(Continued)

FOREIGN PATENT DOCUMENTS

| | | | |
|---|---|---|---|
| CA | 2798626 A1 * | 6/2014 | ....... G06Q 20/40145 |
| JP | 6065025 B2 | 1/2017 | |

(Continued)

OTHER PUBLICATIONS

International Search Report and Written Opinion, dated Dec. 13, 2018 for corresponding PCT Application No. PCT/US2018/043355, International Filing Date Jul. 24, 2018, consisting of 7 pages.

(Continued)

*Primary Examiner* — Matthew Smithers
*Assistant Examiner* — Shu Chun Gao
(74) *Attorney, Agent, or Firm* — Gearhart Law LLC

(57) ABSTRACT

Systems and methods are provided for authenticating a user. The method includes accepting, using a graphical user interface coupled to an electronic computing device, a login request from the user to access a remote server, wherein the login request includes biometric data of the user, using a non-tactile biometric scanner, and comparing, using a processor on an intermediary server, the biometric data of the user with biometric data stored in memory of the intermediary server, wherein the biometric data stored in the memory is associated with one or more known users. The method further includes determining, based on the comparison, whether an identity of the user is authentic, and if the identity of the user is authenticated, relaying the login request to the remote server.

16 Claims, 3 Drawing Sheets

(56) References Cited

U.S. PATENT DOCUMENTS

| | | | |
|---|---|---|---|
| 9,489,783 B2 | 11/2016 | Frank | |
| 2005/0246291 A1* | 11/2005 | Delgrosso | G06Q 20/40 705/67 |
| 2006/0000898 A1* | 1/2006 | Bonalle | G06Q 20/341 235/380 |
| 2006/0112279 A1 | 5/2006 | Cohen et al. | |
| 2010/0216429 A1* | 8/2010 | Mahajan | G06F 21/6245 455/411 |
| 2011/0002461 A1 | 1/2011 | Erhart et al. | |
| 2013/0262873 A1* | 10/2013 | Read | H04W 12/06 713/186 |
| 2015/0186634 A1 | 7/2015 | Crandell et al. | |
| 2015/0356339 A1 | 12/2015 | Demos | |
| 2017/0076294 A1 | 3/2017 | Kojima | |
| 2017/0076549 A1 | 3/2017 | Lech | |
| 2019/0028468 A1 | 1/2019 | Garcia | |

FOREIGN PATENT DOCUMENTS

| | | |
|---|---|---|
| KR | 1020170025923 A | 8/2015 |
| WO | 2009074866 A2 | 6/2009 |

OTHER PUBLICATIONS

"Samsung Applies for Palm Scanning Password Hint Technology Patent," Biometricupdate.com, <http://www.biometricupdate.com/201712/samsung-applies-for-palm-scanning-password-hint-technology-patent>, 2 Pages, Accessed on Mar. 22, 2018.

"Cloud Based IAM for the Modern Enterprise," OneLogin Trust & Security, <https://www.onelogin.com/why-onelogin>, 3 Pages, Accessed Oct. 17, 2017.

"Security Comes Standard," Okta, <https://www.okta.com/>, 8 Pages, Accessed Oct. 17, 2017.

"CIAM Solutions: Customer Identity & Access Management," ForgeRock, <https://www.forgerock.com/identity-soultions/customer-identity/?utm_source=search-paid&utm_medium=adwords&utm_campaign=sap-gigya&utm_content=customer-identity&utm_term=identity-management-system&gclid=Cj0KCQjwsZHBRCIARIsAC-VMPB-hWLnwNzh2BsP259VG946RzAD_JFMUwPeli70mse1drod2F5WemQaArEjEALw_wcB>, 4 Pages, Accessed Oct. 17, 2017.

"The most complete enterprise IAM from the cloud," IBM Security, <https://www.ibm.com/security/cloud/cloud-identity-service/>, 13 Pages, Accessed Oct. 17, 2017.

"Identity-as-a-Service (IDaas) for Cloud and Mobile App Single Sign-on and Security," Centrify, <https://www.centrify.com/solutions/cloud/identity-as-a-service-idaas/>, 5 Pages, Accessed on Oct. 17, 2017.

"Privileged Access Management: Control, Monitor & Manage Privileged Access to Corporate Applications," Lieberman Software, <https://iebsoft.com/solutions/privileged-access-management/>, 6 Pages, Accessed on Oct. 17, 2017.

* cited by examiner

BIOMETRIC CLOUD AUTHENTICATION GATEWAY DATABASE SYSTEM AND METHOD OF USE

CLAIM OF PRIORITY

This application is a Continuation of U.S. patent application Ser. No. 15/657,960 filed Jul. 24, 2017, the contents of which are incorporated herein by reference in their entirety.

FIELD OF THE EMBODIMENTS

This embodiments of this invention relate to biometric authentication systems and, in particular, a non-tactile biometric authentication system having multi-step cloud-based authentication measures.

BACKGROUND OF THE EMBODIMENTS

Authentication systems and devices have existed for many years. These methods and systems include biometric authentication systems, e.g., fingerprint scanners and retina scanners, and non-biometric authentication systems, e.g., username/password, digital tokens, key fobs, smart cards, etc. However, the current available forms of biometric authentication have flaws that cause certain problems. These problems include false positives/negatives during the authentication process.

Approximately 80% of enterprises have experienced two or more data breaches. This is partially due to the fact that the current types of authentication systems have inherent flaws. For example, in non-biometric authentication systems, usernames and passwords can be determined and digital tokens, key fobs, smart cards, and other physical authentication devices can be stolen or copied. In current biometric authentication systems, tactile connection to the devices, such as fingerprint scanners, may result in third parties copying fingerprints. Furthermore, in cases of current biometric scanners, since the user need not be living for the scanners to work, there is no need to keep an individual safe in the event of a forcible entry into a building and/or system.

Due to all of these issues with the current systems and methods of authentication, security teams are under pressure to protect data without having to also restrict users. A more secure method of authentication that does not restrict users is thus needed.

Examples of related art are described below:

U.S. Pat. No. 8,046,588 generally describes systems and methods that facilitate utilizing biometric sensors (e.g., fingerprint, hand scan, voice recognition . . . ) in manufacturing systems in order to maintain accurate safety audit trails. A safety audit system, utilizing a biometric sensing device, facilitates determining if a user is allowed to access and change the configuration of the manufacturing system. Once a user is allowed to change the configuration (e.g., programmable electronics, tooling changes, software updates, etc.) the changes are automatically recorded in a safety audit database. Automatic storage of configuration changes mitigates manual recording of changes thereby enhancing the safety audit data often necessary to meet safety standards for manufacturing systems.

U.S. Pat. No. 9,152,779 generally describes machines and methods of accessing information securely. Two sets of user identifying data are acquired. A transformation is established by mapping of one set of data onto another set of data or onto itself. An invariant is generated from the transformation of the user identifying data. An authentication key is generated using the invariant. In an embodiment, the invariant is a relationship between two objects that remains static under transformations between the two objects. In an embodiment, the invariant is a cryptography key. In an embodiment, the transformation(s) help perform an authentication of the user and are executed by digital computer program instructions. In an embodiment, pattern transformation(s) are represented with colors, geometry, or frequencies. U.S. Pat. No. 9,165,130 generally describes a technique for mapping a biometric credential of a user to a data value such as a key or password. A database stores multiple entries of biometric templates and associated data values for different users. One of the entries is a match for a particular user, and the remaining entries are randomly selected. The number of entries is reasonably large to provide a desired degree of randomness for a given entry, but smaller than a key space of the data values. Based on an input of a biometric sample of the user, a best match is selected from the entries of biometric templates, and the associated data value is used to authenticate the user. Two- or three-factor authentication can be provided. Additional factors can include a password provided by the user and a key which is encrypted by the data value of the matching entry.

U.S. Pat. No. 9,489,783 generally describes a door system that includes a door frame, at least one door leaf and a door drive with a control unit. The door leaf is equipped with a hand vein scanner for detecting the hand vein profile when a hand is held a distance in front of the hand vein scanner for recognizing the user. A programmable computer with a memory element, in which a plurality of user hand vein profiles can be stored, is housed in the interior of the door leaf. A hand vein profile is compared to the hand vein profiles stored in the memory of the computer and, depending on a match, the door is opened or not. The computer is programmed and supplied with power via a network interface that terminates in the edge of the door leaf or the peripheral area and is the only interface between the door leaf and the door frame, other than a signal cable for the control unit for the door drive. The computer can be programmed by temporarily connecting an external computer to this network interface. The network interface is also used for connecting a power supply for the computer.

U.S. Patent Publication No. 2011/0002461 generally describes a system for securing an integrated circuit chip used for biometric sensors, or other electronic devices, by utilizing a physically unclonable function (PUF) circuit. These PUF functions are in turn used to generate security words and keys, such as an RSA public or private key. Such a system can be used to protect biometric security sensors and IC chips, such as fingerprint sensors and sensor driver chips, from attack or spoofing. The system may also be used in an efficient method to produce unique device set-up or power-up authentication security keys. These keys can be generated on a low frequency basis, and then frequently reused for later security verification purposes. In operation, the stored keys can be used to efficiently authenticate the device without the need to frequently run burdensome security key generation processes each time, while maintaining good device security.

U.S. Patent Publication No. 2015/0186634 generally describes one or more biometric templates that can be stored for a user. The user can access a verification system by scanning biometric data, such as a fingerprint or iris scan, into a biometric reader. A biometric access system can determine whether the scanned biometric data matches one of the biometric templates of the user. If so, then the user may be permitted access to the verification system. The verification system can accept user input from one or more input devices, such as a keyboard, mouse, touchscreen, combinations of the same, or the like. The verification system can programmatically analyze the user input and output one or more reports for presentation to other users.

U.S. Patent Publication No. 2017/0076294 generally describes a device security management apparatus that includes: a communication unit that communicates with a device, via a network within a building; a memory unit that memorizes biometric information for each of a plurality of operators; a biometric information acquisition unit that acquires biometric information from the device via the communication unit; a biometric authentication unit that compares the acquired biometric information with the memorized biometric information, to identify an operator corresponding to the acquired biometric information; and a device control unit that notifies the device of control information for bringing the device into an operable state in a case where the biometric authentication unit has identified the operator corresponding to the acquired biometric information, and notifies the device of control information for bringing the device into an inoperable state in a case where the biometric authentication unit has not identified the operator corresponding to the acquired biometric information.

U.S. Patent Publication No. 2017/0076549 generally describes a gaming system comprising a gaming server, and a plurality of user terminals, the gaming server and the gaming machines being connected via a network; the gaming server providing a database to store a plurality of records, each record having an account number as a key value; each of the gaming machines comprising a biometric interface for requesting a user's biometric data for storing with the account; and means for handling e-wallet cash information of the user; and wherein at least one user terminal is adapted as a cash out terminal to provide cash payout of the users e-wallet to the user upon authentication by means of the biometric interface and the stored biometric data.

International Patent Publication No. WO2009074866A2 generally describes a verification arrangement comprising an article carrying an alphanumeric article identification code and a verification entity storing a number of approved identification codes and being adapted in such a manner that upon input of the article identification code by the user, the verification entity outputs a response indicating whether the input article identification code is identical to one of the stored approved identification codes.

None of the art described above addresses all of the issues that the present invention does. Various systems and methodologies are known in the art. However, their structure and means of operation are substantially different from the present disclosure.

At least one embodiment of this invention is presented in the drawings below and will be described in more detail herein.

SUMMARY OF THE EMBODIMENTS

According to an aspect of the present invention, a method is provided for authenticating a user. The method includes accepting, using a graphical user interface coupled to an electronic computing device, a login request from the user to access a remote server, wherein the login request includes biometric data of the user, using a non-tactile biometric scanner, and comparing, using a processor on an intermediary server, the biometric data of the user with biometric data stored in memory of the intermediary server, wherein the biometric data stored in the memory is associated with one or more known users. The method further includes determining, based on the comparison, whether an identity of the user is authentic, and if the identity of the user is authenticated, relaying the login request to the remote server.

According to another aspect of the present invention, a system for authenticating a user is provided. The system includes a biometric scanner configured to scan a portion of the user, creating biometric data of the user, and an electronic computing device, the electronic computing device including a memory, a processor, and a graphical user interface configured to receive a login request from the user to access a remote server, wherein the login request includes the biometric data of the user. The system further includes an intermediary server, the intermediary server including one or more memory banks configured to store biometric data of known users, and a processor configured to compare the biometric data of the user with the biometric data stored in the memory banks of the intermediary server, determine, based on the comparison, whether an identity of the user is authentic, and, if the identity of the user is authenticated, relay the login request to the remote server. The system further includes the remote server.

It is an object of the present invention to provide the method for authenticating a user, the method further including relaying, using a processor coupled to the electronic computing device, the login request to the intermediary server.

It is an object of the present invention to provide the method for authenticating a user, wherein the determining whether the identity of the user is authentic further includes determining whether the biometric data of the user matches biometric data stored in the memory and associated with a particular user.

It is an object of the present invention to provide the method for authenticating a user, wherein, if the biometric data of the user matches the biometric data stored in the memory and associated with a particular user, the identity of the user is authenticated.

It is an object of the present invention to provide the method for authenticating a user, wherein the biometric scanner is a Vascular Recognition Technology (VRT) biometric scanner. It is an object of the present invention to provide the method for authenticating a user, wherein the VRT biometric scanner is a non-tactile scanner configured to scan one or more veins in a hand of the user.

It is an object of the present invention to provide the method for authenticating a user, wherein the biometric scanner is coupled to the electronic computing device.

It is an object of the present invention to provide the method for authenticating a user, wherein the method further includes, if the identity of the user is not authenticated, displaying, to the user, using the graphical user interface, that the identity of the user is not authenticated.

It is an object of the present invention to provide the method for authenticating a user, wherein the method further includes approving or denying the login request, using a processor of the remote server.

It is an object of the present invention to provide the method for authenticating a user, wherein the method further includes relaying to the intermediary server, using the processor of the remote server, a message signaling whether the login request has been approved or declined.

It is an object of the present invention to provide the method for authenticating a user, wherein the method further includes relaying to the electronic computing device, using the processor of the intermediary server, the message signaling whether the login request has been approved or declined.

It is an object of the present invention to provide the system for authenticating a user, wherein the processor of the electronic computing device is configured to relay the login request to the intermediary server.

It is an object of the present invention to provide the system for authenticating a user, wherein the processor of the intermediary server is further configured to determine whether the biometric data of the user matches biometric data stored in the memory banks of the intermediary server and associated with a particular user.

It is an object of the present invention to provide the system for authenticating a user, wherein the processor of the intermediary server is further configured to authenticate a user if the biometric data of the user matches the biometric data stored in the memory banks of the intermediary server and associated with a particular user.

It is an object of the present invention to provide the system for authenticating a user, wherein the biometric scanner is a Vascular Recognition Technology (VRT) biometric scanner.

It is an object of the present invention to provide the system for authenticating a user, wherein the VRT biometric scanner is a non-tactile scanner configured to scan one or more veins in a hand of the user.

It is an object of the present invention to provide the system for authenticating a user, wherein the biometric scanner is coupled to the electronic computing device.

It is an object of the present invention to provide the system for authenticating a user, wherein the remote server includes a processor configured to approve or deny the login request.

It is an object of the present invention to provide the system for authenticating a user, wherein the processor of the remote server is further configured to relay, to the intermediary server, a message signaling whether the login request has been approved or declined.

DESCRIPTION OF THE PREFERRED EMBODIMENTS

Figure 1:
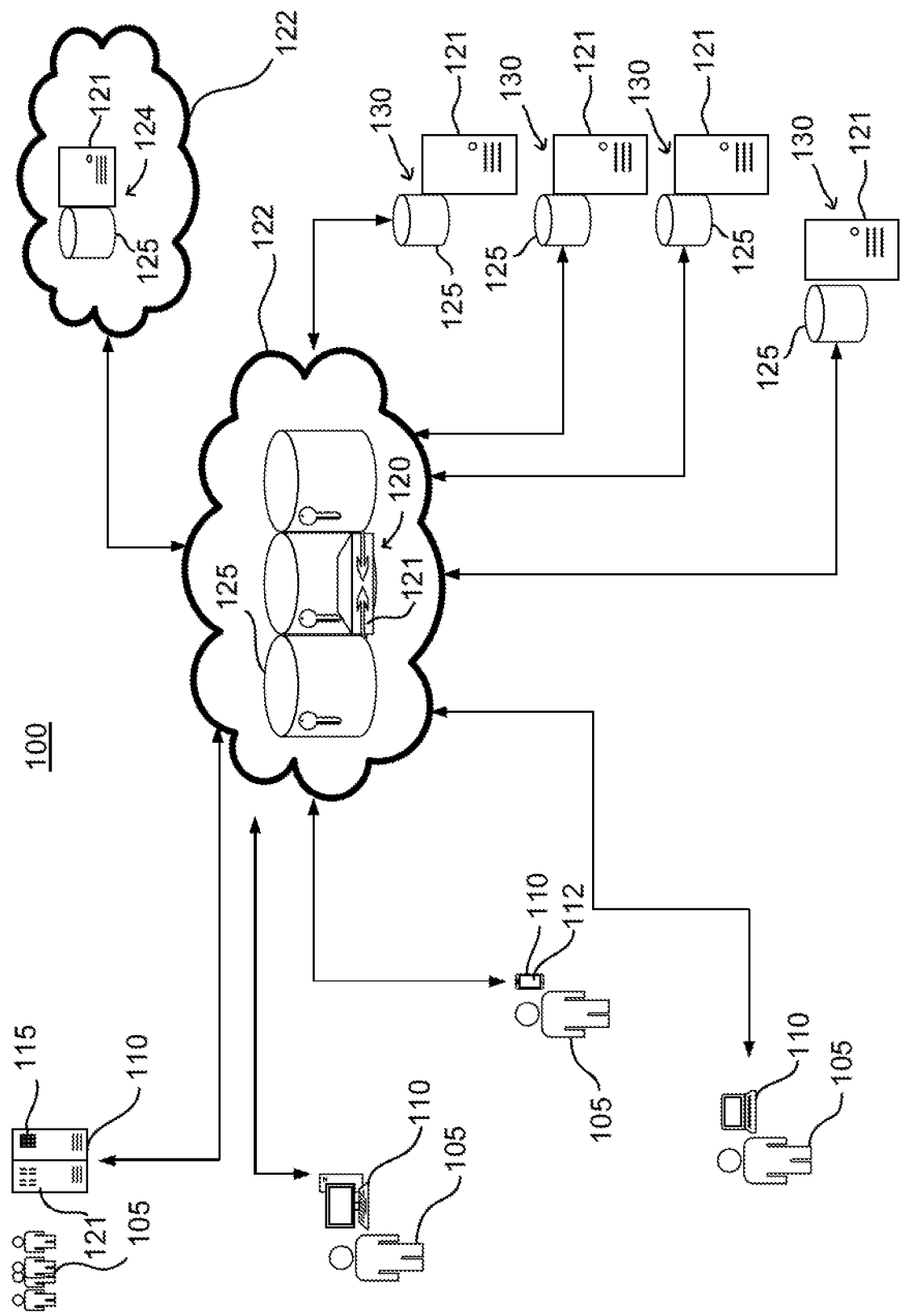
FIG. 1 shows a system for authenticating a user using biometric analysis and cloud-based authentication, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a system 100 for authenticating a user using biometric analysis and cloud-based authentication is illustratively depicted, in accordance with an embodiment of the present invention.

According to an embodiment, the present system 100 includes a biometric scanner/sensor 115. The system 100 further includes an authentication gateway database 120, the authentication gateway database 120 including one or more memory banks 125 and one or more processors 121, wherein the memory banks 125 store biometric and/or other authentication data associated with one or more users 105, and wherein the processor is configured to perform one or more of the functions describes in method 200 of FIGS. 2-3.

According to an embodiment, the biometric scanner/sensor 115 is a Vascular Recognition Technology (VRT) biometric scanner 115. The VRT biometric scanner 115 has the capability of scanning the hand of a user 105 and identifies the size and/or positions of one or more veins in the user's 105 hand. Using, VRT, the VRT scanner 115 images one or more blood vessels in the hand of the user 105, thus mapping one or more veins in the user's 105 hand, creating a vascular pattern of the user's 105 hand. These vascular patterns are unique to every individual user 105 and require blood flowing through the veins in order for the VRT scanner 115 to detect the vascular pattern of the user 105, thus requiring the user 105 to have blood flowing through the user's 105 hand during the scanning process.

According to an embodiment, the vascular pattern is imaged by the VRT scanner 115 by shining light (e.g., near-infrared light) onto the hand of the user 105. The light reflects off of one or more blood vessels, enabling the VRT scanner 115 to map the vascular pattern of the veins in the user's 105 hand. According to an embodiment, the VRT scanner 115 is a non-tactile/contactless scanner 115, enabling the user 105 to be scanned by the VRT scanner 115 without having to come into physical contact with the scanner 115. According to an embodiment, the scanner 115 may include other forms of biometric scanner such as, but not limited to, fingerprint scanners, retina scanners, etc., and/or non-biometric authentication devices such as, but not limited to, card readers, keypads, etc.

According to an embodiment, the user initially scans the user's hand using the VRT scanner 115 (also herein referred to as a handvein scanner). The data pertaining to the scan is stored in a memory bank 125 in the authentication gateway database 120 and is associated with the user 105. Scans from multiple users 105 may be stored in the authentication gateway database 120. According to an embodiment, identifiable data pertaining to the user 105 may be stored in a server 124 that is separate and apart from the authentication gateway database 120 and may also include one or more memory banks 125 and one or more processors 121.

According to an embodiment, the memory banks 125 of the authentication gateway database 120 is used to validate biometric identifications and does not store personal information pertaining to the user 105. According to an embodiment, the biometric identification information stored in the memory banks 125 of the authentication gateway database 120 is encrypted.

According to an embodiment, the user 105 initiates a login request to one or more sources. These one or more sources may have one or more associated servers connected to the authentication gateway database. According to an embodiment, the login request includes scanning the user's 105 hang using the contactless VRT biometric scanner 115.

According to an embodiment, the user 105 accesses a login screen using a graphical user interface 112 on the electronic computing device 110. The electronic computing device 110 may be, e.g., a smartphone, a laptop computer, a personal computer, a tablet computer, and/or any other suitable electronic computing device 110. According to an embodiment, the electronic computing device 110 may include one or more processors 121 and/or memory. According to an embodiment, the graphical user interface 112 is a tactile graphical user interface 112. According to an embodiment, the graphical user interface 112 is a non-tactile/contactless graphical user interface 112. According to an embodiment, the user, using the graphical user 105 interface, sends a login request to one or more sources 130 into which the user is attempting to gain access.

The sources 130 may be remote servers which may include one or more memory banks 125 and or processors 121. The one or more sources 130 are coupled to the authentication gateway database 120. According to an embodiment, the VRT scanner 115 is separate and apart from the electronic computing device 110. According to an embodiment, the VRT scanner 115 is coupled to and/or part of the electronic computing device 110.

According to an embodiment, the authentication gateway database 120 may be configured to connect one or more users 105 with one or more sources 130 into which the user is attempting to gain access. The sources 130 may be, e.g., a bank, a place of learning, a warehouse club account, a healthcare/health insurance account, one or more work-related accounts, access to a building, or any other source 130 that requires the authentication of a user 105 prior to the granting of access to the user 105.

According to an embodiment, the electronic computing device 110, the VRT scanner 115, the authentication gateway database 120, the secondary server 124 of the user 105, and/or the one or more sources 130 may be coupled to each other, either directly or indirectly. Any or all of the methods of coupling may be wired and/or wireless connections such as, but not limited to, use of the cloud 122.

Figure 2:
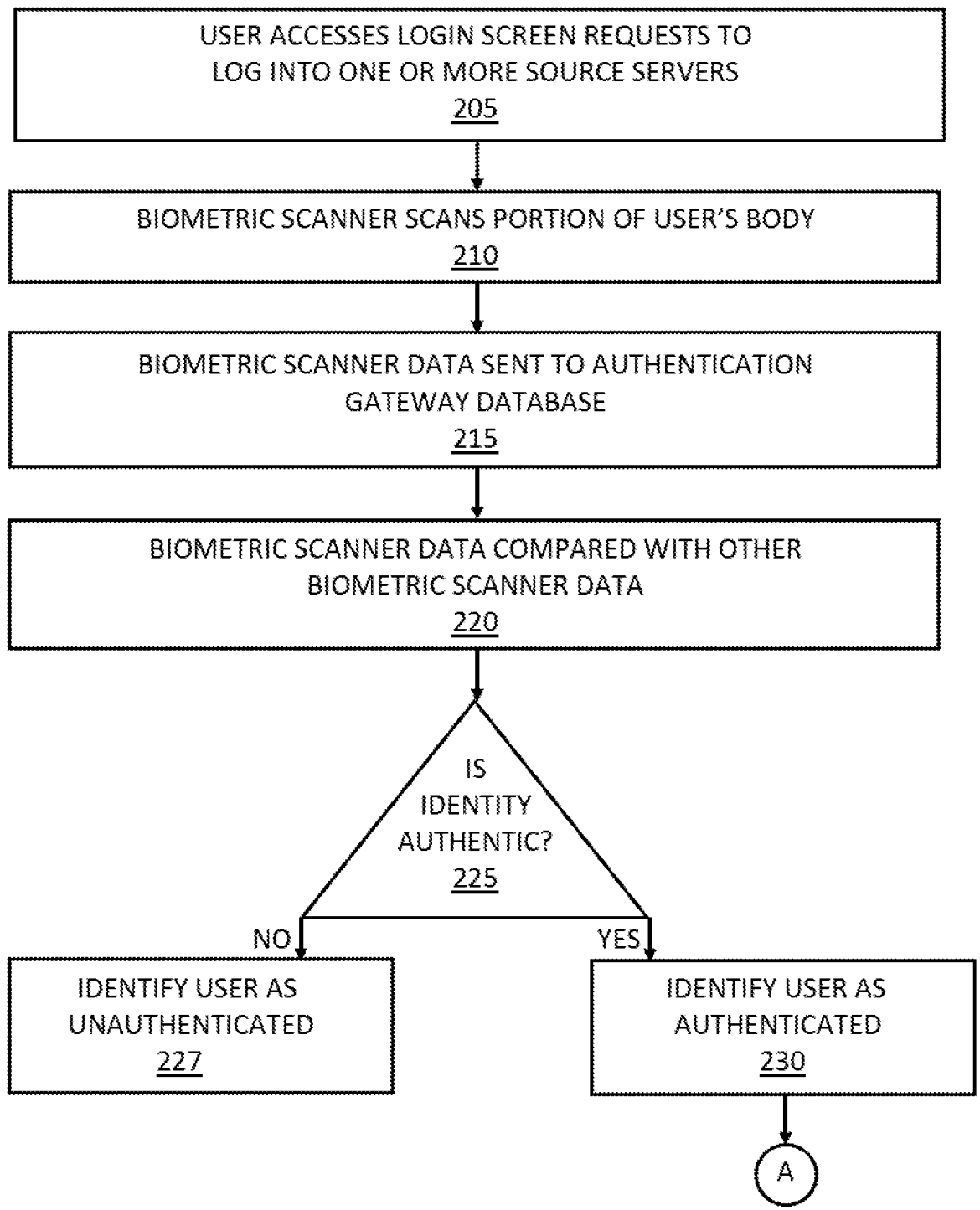
FIGS. 2-3 show a method for authenticating a user using biometric analysis and cloud-based authentication, according to an embodiment of the present invention.
Figure 3:
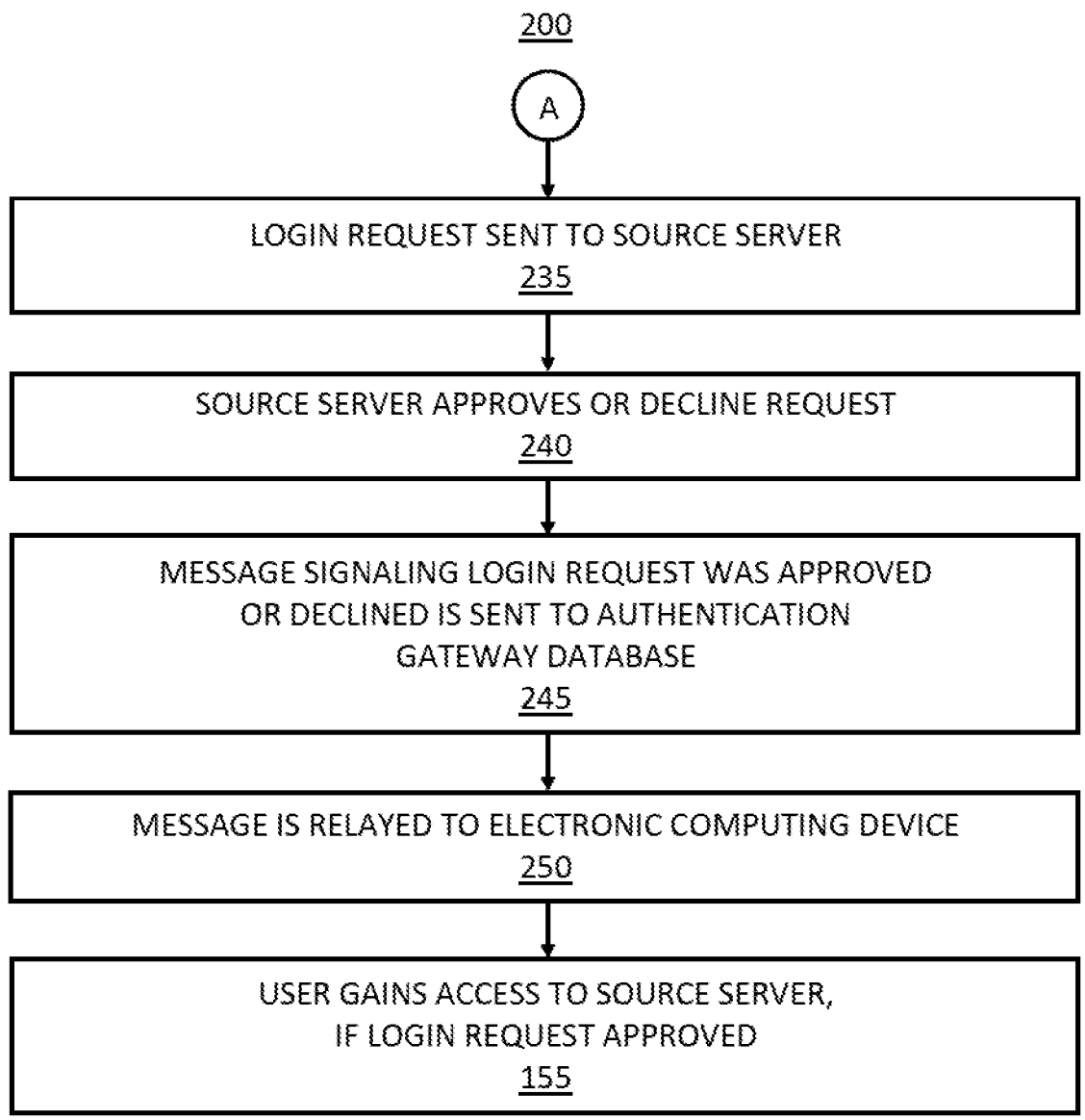

Referring now to FIGS. 2-3, a method 200 for authenticating a user using biometric analysis and cloud-based authentication is illustratively depicted, in accordance with an embodiment of the present invention.

At step 205, a user accesses a login screen using a graphical user interface 110 on an electronic computing device 112 requests to be logged into one or more source servers 130. The electronic computing device 110 may be, e.g., a smartphone, a laptop computer, a personal computer, a tablet computer, and/or any other electronic computing device 110 suitable for the present method 200. This enables the user 105 to send a login request to one or more sources 130 into which the user 105 is attempting to gain access.

At step 210, the biometric scanner 115 scans a portion of the user's 115 body. According to an embodiment, the portion of the user 105 that is scanned is the hand of the user 105. According to an embodiment, the biometric scanner 115 is coupled to the electronic computing device 110. According to an embodiment, the biometric scanner 115 is permanently affixed to the electronic computing device 110. According to an embodiment, the biometric scanner 115 is removably coupled to the electronic computing device 110. According to an embodiment, the biometric scanner 115 is a VRT scanner 115.

At step 215, the data captured from the biometric scanner 115 is sent to the authentication gateway database 120. According to an embodiment, the authentication gateway database 120 may include a remote server, a processor 121, and/or one or more memory banks 125. The memory banks 125 may store biometric data related to one or more users 105.

At step 220, the authentication gateway database 120 compares the data gathered from the biometric scanner 115 against biometric data associated with one or more users stored in the memory banks 125 of the authentication gateway database 120. According to an embodiment, the authentication gateway database 120 may access biometric data with which to compare in a remote server 124.

According to an embodiment, if the authentication gateway database 120 does not recognize the biometric data gathered from the biometric scanner 115 with the biometric data associated with any of the users 105 stored in the memory banks 125, the authentication gateway database 120, at step 227, indicates that the user's 105 identity is not authenticated. This indication may include displaying a message and/or image to the user and/or the source into which the user 105 is attempting to gain access. According to an embodiment, the message and/or image is displayed onto a graphical user interface 112 of the electronic mobile device 110. According to an embodiment, if the user 105 indicates the user's 105 identity and the data gathered from the biometric scanner 115 does not match the identity indicated by the user 105, the user's 105 identity will not be authenticated.

According to an embodiment, at step 230, if the data gathered from the biometric scanner 115 matches the biometric data associated with a user 105 that is saved on the memory banks 125 of the authentication gateway database 120, the user's 105 identity is verified and authenticated.

At step 235, if the user's 105 identity is authenticated, the system 100 sends the user 105 login request to the source server 130 into which the user 105 is attempting to gain access. At step 240, upon receiving the request from the user 105 and the authentication of the user 105, the source server 130 either approves of the transaction requested by the user 105 or declines the transaction requested by the user 105.

At step 245, after the request from the user 105 has been approved or declined, the source server 130 sends a message to the authentication gateway database 120 indicating the source server's 130 decision regarding the user's 105 request. At step 250, the authentication gateway database 120 relays the source server's 130 decision regarding the user's 105 request.

At step 255, if the source server 130 approves of the user's 105 request, the user 105 gains access to the source server 130 to which the login request was made, enabling the user 105 to log into the source server 130.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™ HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users (e.g., operators and physicians) table may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table may include fields such as, but not limited to: user_id, client_id, client_ip, client_type, client_model, operating_system, os_version, app_installed_flag, and/or the like. An Apps table may include fields such as, but not limited to: app_ID, app_name, app_type, OS_compatibilities_list, version, timestamp, developer_ID, and/or the like. A beverages table including, for example, heat capacities and other useful parameters of different beverages, such as depending on size beverage_name, beverage_size, desired_coolingtemp, cooling_time, favorite_drinker, number_of_beverages, current_beverage_temperature, current_ambient_temperature, and/or the like. A Parameter table may include fields including the foregoing fields, or additional ones such as cool_start_time, cool_preset, cooling_rate, and/or the like. A Cool Routines table may include a plurality of cooling sequences may include fields such as, but not limited to: sequence_type, sequence_id, flow_rate, avg_water_temp, cooling_time, pump_setting, pump_speed, pump_pressure, power_level, temperature_sensor_id_number, temperature_sensor_location, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for authenticating a user, the method comprising:
   accepting, using a graphical user interface coupled to an electronic computing device, a login request from the user to access a remote server,
   wherein the login request includes biometric data of the user, using a non-tactile biometric scanner,
   wherein the biometric data is linked with non-biometric data of the user, wherein the biometric scanner uses infrared light to obtain a vascular pattern associated with the user, the vascular pattern comprising vasculature in both a palm and at least one finger of the user and a size and position of one or more blood vessels of the vasculature;
   comparing, using a processor on an intermediary server, the biometric data of the user with biometric data stored in memory of the intermediary server,
   wherein the biometric data stored in the memory is associated with one or more known users, and wherein the non-biometric data is stored on a separate server from the biometric data;
determining, based on the comparison of the biometric data and non-biometric data, whether an identity of the user is authentic; and
if the identity of the user is authenticated, relaying the login request to the remote server;
and if the identity of the user is not authenticated, notifying the user and the remote server.

2. The method as recited in claim 1, further comprising relaying, using a processor coupled to the electronic computing device, the login request to the intermediary server.

3. The method as recited in claim 1, wherein the determining whether the identity of the user is authentic further includes:
determining whether the biometric data of the user matches biometric data stored in the memory and associated with a particular user.

4. The method as recited in claim 3, wherein, if the biometric data of the user matches the biometric data stored in the memory and associated with a particular user, the identity of the user is authenticated.

5. The method as recited in claim 1, wherein the biometric scanner is coupled to the electronic computing device.

6. The method as recited in claim 1, further comprising:
if the identity of the user is not authenticated, displaying, to the user, using the graphical user interface, that the identity of the user is not authenticated.

7. The method as recited in claim 1, further comprising:
approving or denying the login request, using a processor of the remote server.

8. The method as recited in claim 7, further comprising:
relaying to the intermediary server, using the processor of the remote server, a message signaling whether the login request has been approved or declined.

9. The method as recited in claim 8, further comprising:
relaying to the electronic computing device, using the processor of the intermediary server, the message signaling whether the login request has been approved or declined.

10. A system for authenticating a user, the system comprising:
a biometric scanner configured to scan a portion of the user, creating biometric data of the user,
wherein the biometric scanner uses infrared light to obtain a vascular pattern associated with the user, the vascular pattern comprising vasculature in both a palm and at least one finger of the user and a size and position of one or more blood vessels of the vasculature, and
wherein the biometric data is linked with non-biometric data of the user;
an electronic computing device, the electronic computing device including:
a memory;
a processor; and
a graphical user interface configured to receive a login request from the user to access a remote server,
wherein the login request includes the biometric data of the user;
an intermediary server, the intermediary server including:
one or more memory banks configured to store biometric data of known users,
and wherein the non-biometric data is stored on a separate server from the biometric data; and
the processor configured to:
compare the biometric data of the user with the biometric data stored in the memory banks of the intermediary server and the non-biometric data with the biometric data;
determine, based on the comparison, whether an identity of the user is authentic; and
if the identity of the user is authenticated, relay the login request to the remote server, and
if the identity of the user is not authenticated, notifying the user and the remote server; and
the remote server.

11. The system as recited in claim 10, wherein the processor of the electronic computing device is configured to relay the login request to the intermediary server.

12. The system as recited in claim 10, wherein the processor of the intermediary server is further configured to determine whether the biometric data of the user matches biometric data stored in the memory banks of the intermediary server and associated with a particular user.

13. The system as recited in claim 12, wherein the processor of the intermediary server is further configured to authenticate a user if the biometric data of the user matches the biometric data stored in the memory banks of the intermediary server and associated with a particular user.

14. The system as recited in claim 10, wherein the biometric scanner is coupled to the electronic computing device.

15. The system as recited in claim 10, wherein the remote server includes:
a processor configured to approve or deny the login request.

16. The system as recited in claim 15, wherein the processor of the remote server is further configured to:
relay, to the intermediary server, a message signaling whether the login request has been approved or declined.

* * * * *